United States Patent [19]

Durham, Jr. et al.

[11] 4,319,483

[45] Mar. 16, 1982

[54] METHOD OF AUTOMATED FLUID FLOW MEASUREMENT

[75] Inventors: Kenneth M. Durham, Jr.; Roy W. Tarpley, both of Garland; Larry A. Rehn, Rowlett, all of Tex.

[73] Assignee: Texas Instruments Incorporated, Dallas, Tex.

[21] Appl. No.: 124,419

[22] Filed: Feb. 25, 1980

[51] Int. Cl.³ .............................................. G01F 1/68
[52] U.S. Cl. .................................................... 73/204
[58] Field of Search ......................................... 73/204

[56] References Cited

U.S. PATENT DOCUMENTS

| | | | |
|---|---|---|---|
| 2,800,018 | 7/1957 | Phillips et al. | 73/204 |
| 3,363,462 | 1/1968 | Sabin | 73/204 |
| 3,992,940 | 11/1976 | Platzer, Jr. | 73/204 |
| 4,142,170 | 2/1979 | Blatter | 73/204 |
| 4,213,335 | 7/1980 | Peter et al. | 73/204 |

OTHER PUBLICATIONS

C.GS Datametrics Bulletin 600, pub. 1971, p. 4 & FIGS. 1-3.
Shepard, "A Self-excited, alternating-current constant temperature hot-wire anemometer" in NACA Technical Note 3406, 4/55, pp. 1-6, 19, 23.

*Primary Examiner*—Herbert Goldstein
*Attorney, Agent, or Firm*—Robert D. Marshall, Jr.; Leo N. Heiting; Melvin Sharp

[57] ABSTRACT

An automated fluid flow measurement system employs two temperature sensitive silicon resistors having tracking temperature coefficients. The resistors have equal impurity concentration but different values of resistance. The first temperature sensitive resistor is employed to measure the temperature of a flowing fluid. The second temperature sensitive resistor is electrically heated to a temperature at a predetermined amount greater than the measured temperature of the fluid. Because the rate of heat transfer from the heated temperature sensitive resistor to the fluid depends upon the rate at which the fluid passes this temperature sensitive resistor, the power required in order to maintain the predetermined temperature difference in the second temperature sensitive resistor is a measure of the flow rate of the fluid. The automated fluid flow measurement system also includes an active self-balancing Wheatstone bridge circuit which automatically applies the required amount of power to the second temperature sensitive resistor in order to maintain the temperature difference and further automatically supplies a signal proportional to this applied power and therefore proportional to the flow rate.

5 Claims, 6 Drawing Figures

METHOD OF AUTOMATED FLUID FLOW MEASUREMENT

BACKGROUND

The general field to which this invention most closely relates is the field of flow measurement by measurement of the rate of heat transfer from a hot body to the moving fluid. Previously known in this field are instruments known as hot-wire anemometers which are composed of thin wires of silver-platinum or tungsten which are disposed in the fluid flow. These instruments tend to be very fragile due to the small wire diameters ordinarily employed and further tend to have great calibration problems due to a number of factors including deposition of dust particles on the wire. Shielded hot-wire anemometers have also been proposed in which the hot-wire is enclosed within a cylindrical sleeve to reduce the effect of dust deposition and to provide greater mechanical strength for the instrument at the expense of decreased sensitivity. Because the rate of cooling of these apparatuses is dependent upon the fluid temperature, inaccurate results are obtained unless the fluid temperature is either controlled or measured. Due to the difficulties in calibration of these instruments, it is difficult to construct a temperature measuring instrument having the tracking temperature characteristics in order to provide a correction for the fluid temperature.

SUMMARY OF THE INVENTION

One embodiment of the present invention employs doped silicon temperature sensitive resistors as the sensors. These sensors exhibit a positive temperature coefficient of resistance in the extrinsic region, that is the region in which their resistivity is determined by the impurity level rather than being independent of the impurity level. Two such sensors are employed. A first sensor is used to measure the temperature of the fluid. A second sensor is electrically heated to a temperature which is a predetermined amount greater than the temperature of the fluid as measured by the first sensor. The amount of electric power necessary to heat the second resistor to this temperature is a measure of the rate of heat loss to the fluid flowing past the sensor. Thus, this amount of electric power provides a measure of the fluid flow rate.

In order to automate the flow measurement system a self-balancing Wheatstone bridge circuit using a differential amplifier is employed. Two branches of the Wheatstone bridge circuit are fixed resistors, a third branch includes the first sensor and may include another fixed resistor and the fourth branch is the second sensor. The fixed resistors are selected so that the bridge is in balance only if the second sensor is a predetermined amount higher in temperature than the first sensor. The differential amplifier is responsive to the difference in voltage across the third and fourth branches and provides an output voltage which is applied across the bridge circuit. The resistances of the first and second sensors are selected so that most of the bridge current flows through the second sensor and the first sensor has negligible electrical self heating. The differential amplifier thus adjusts its output voltage to balance the bridge circuit. The differential amplifier output voltage is a measure of the heat loss in the second sensor and thus a measure of the fluid flow.

BRIEF DESCRIPTION OF THE DRAWINGS

The above described objects of the invention will become clearer in the detailed explanation of the invention which follows, when taken in conjunction with the figures in which.

DETAILED DESCRIPTION OF THE INVENTION

The principle of operation of the present automated fluid flow sensor is based upon the heat transfer between a heated element and the fluid of interest. Primarily, this heat transfer occurs due to convective cooling of the heated element by the moving fluid. Heat loss due to radiation is negligible since the operating temperature is relatively low, and the temperature differential between the heated element and the fluid is small. Heat loss due to conduction to surrounding support structure remains constant, and, therefore, is not a factor in the operation of the device, since the temperature differential between the fluid and the heated element remain fixed.

The heat balance of the heated element is governed by the continuity equation $$C \, dT/dt = P_{in} - P_{out} \tag{1}$$

where $P_{in}$ and $P_{out}$ are the rates of energy (power) flowing into and out of the sensing element. If the input and the output powers are not equal, the sensor experiences a change in temperature (dT/dt) proportional to its specific heat (C). Under steady-state conditions, as in the case for the flow sensor, the temperature is not changing and equation (1) reduces to a balance between input and output power.

$$P_{in} = P_{out} \tag{2}$$

The output power is the rate of energy loss due to convective cooling by the surrounding fluid. The power dissipation is proportional to the surface area of the heated element in contact with the fluid and the temperature difference between the heated element and the medium:

$$P_{out} = h A_s \Delta T \tag{3}$$

where: h is the constant of proportionality; $A_s$ is the surface area of the heated element in contact with the fluid; and $\Delta T$ is the temperature difference. The convection coefficient h depends upon such factors as the physical properties of the fluid and the flow regime (velocity) as well as temperature and geometry effects. Because of this, the exact form of h has been studied and modified by many researchers to reflect a particular and often limited region of interest. Note that h is also proportional to mass velocity dm/dt. For some fluids the factors controlling h are fairly constant over a limited range of temperatures. In this case the expression of Equation (3) can be changed to yield $$P_{out}=(A+Bv^{0.5})\Delta T \quad (4)$$

where: A and B are both constant. If a constant temperature $\Delta T$ is maintained between the heated element and the fluid, the power lost depends only upon the velocity, and hence, the mass flow of the surrounding fluid. The flow sensor described herein is based upon this idea.

Figure 1:
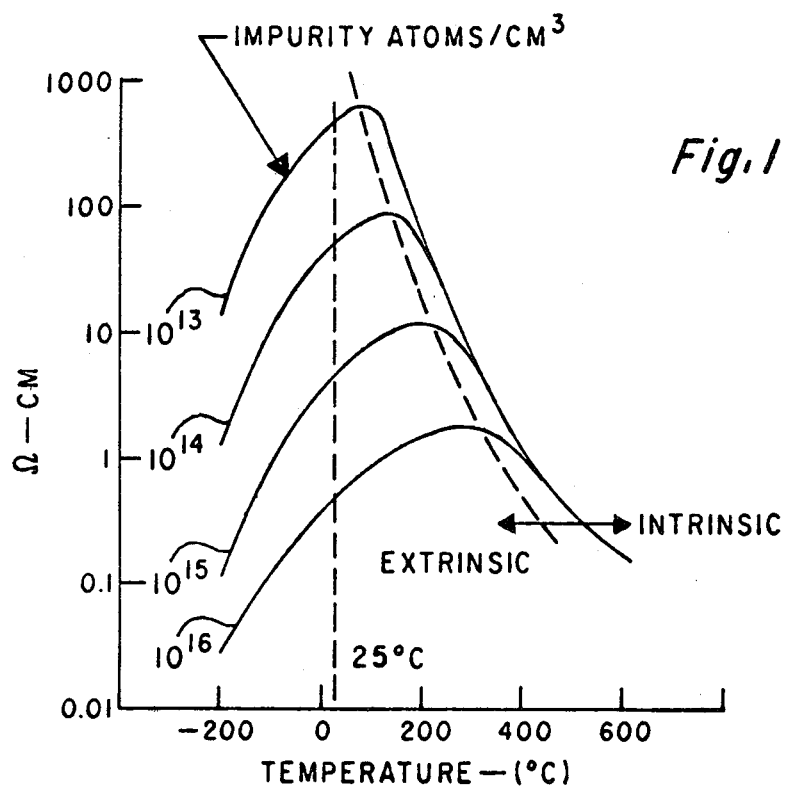
FIG. 1 is a graph illustrating the resistivity of n-type silicon as a function of temperature for various impurity concentrations.

In order to obtain a constant temperature differential between the heat source and the fluid, it is necessary to monitor the fluid temperature. A temperature sensor and a flow sensor (or heated element) are located in the fluid and make up the dual-element portion of the automated fluid flow measurement system. The nature of the present invention requires that the temperature sensitivity of both the temperature sensor and the flow sensor match throughout the temperature range of interest. This temperature characteristic matching is achieved by constructing both of these sensors from bulk doped silicon resistors. FIG. 1 illustrates the specific resistivity of n-type silicon as a function of temperature for a variety of donor impurity concentrations. Note that the family of curves illustrates two regions of temperature characteristics. In the intrinsic region of each of the family of curves, the specific resistivity is independent of the impurity concentration. In the extrinsic region, the specific resistivity is a function of the donor impurity concentration. As seen in FIG. 1, in the intrinsic region the n-type silicon exhibits a negative temperature coefficient of resistance, that is the resistance decreases with increasing temperature. In contrast, in the extrinsic region, the n-type silicon exhibits a positive temperature coefficient of resistance, that is the resistance increases with increasing temperature. This dual region characteristic of the specific resistivity is due to separate mechanisms contributing to the resistivity. It is known that the conductivity within a silicon crystal is determined by the concentration of charge carriers and their average mobility. In the extrinsic region, that is for relatively low temperatures, the number of charge carriers is relatively constant and is determined by the donor impurity concentration. Relatively few charge carriers are liberated directly from the ordinary silicon atoms in the crystal lattice as compared with the number provided by the impurity atoms. It is also known that the mobility of these charge carriers decreases with increasing temperature due to increased scattering of the charge carriers from the more rapidly moving atoms in the crystal lattice as the temperature increases. Therefore, the number of charge carriers remains relatively constant and their mobility decreases thereby producing the increasing resistivity noted in FIG. 1. In the intrinsic region, the number of thermally liberated charge carriers becomes significant as compared to the number of donor provided charge carriers. Since it is known that the number of thermally liberated charge carriers increases with increasing temperature, this increased number of charge carriers provides the decreased resistivity noted in FIG. 1. It is possible then to match the temperature sensitivities of the two sensors by constructing each sensor from a silicon bulk resistor having matching impurity concentrations and further selecting this impurity concentration in order that these sensors remain within the extrinsic region throughout their expected operating temperature range. This selection of materials for the sensor insures that the specific resistivity of these sensors is matching, even though the particular sensors may be constructed of different dimensions thereby providing sensors of different total resistances. FIG. 1 clearly illustrates that if the operating temperature range is centered about room temperature (25° C.), then the impurity atom concentration can take the range from $10^{13}$ to $10^{16}$ impurity atoms per cubic centimeter and still insure that the temperature sensors remain within the extrinsic region.

Figure 2:
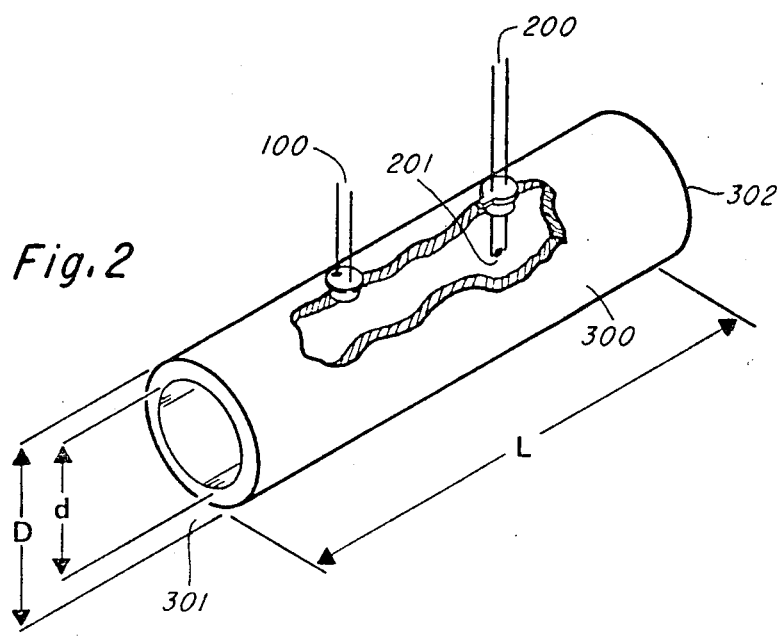
FIG. 2 is an illustration of the position of the two silicon temperature sensitive resistors disposed in the tube housing.

FIG. 2 illustrates the general mechanical construction of the automated flow measurement system of the present invention. Temperature sensor 100 and flow sensor 200 are disposed within a flow tube 300. Flow tube 300 has an inside diameter d, an outside diameter D and a total length L. The fluid which the flow rate is to be measured flows into inlet 301 through flow tube 300 and exits from outlet 302. Temperature sensor 100 passes through the wall of flow tube 300 and is exposed to the fluid on the inside of flow tube 300. Preferably temperature sensor 100 does not protrude greatly into the flow path of the fluid through flow tube 300 in order to prevent disruption of the flow at this point. Flow sensor 200 includes silicon bulk resistor 201 disposed in the center of flow tube 300. In this position, silicon bulk resistor 201 is disposed in the center of the fluid flow for maximum heat exchange with a minimum disruption of the fluid flow.

Temperature sensor 100 may be embodied by commercially available positive temperature coefficient thermistors. It is preferred that temperature sensor 100 be a type TSM102 manufactured by Texas Instruments Incorporated when the flow sensor is employed to measure a liquid flow rate. It is preferred that the temperature sensor be type TSF102 when the flow sensor is employed to measure a gas flow rate. These sensors are described in "Type TSM102 positive-temperature-coefficient silicon thermistor" Bulletin No. DL-12628, June, 1978, and "Type TSF102 positive-temperature-coefficient silicon sensor," Oct. 19, 1979, both available from Texas Instruments Incorporated, P. O. Box 225012, Dallas, Tex. 75265. Note FIG. 2 illustrates type TSM102.

Figure 3:
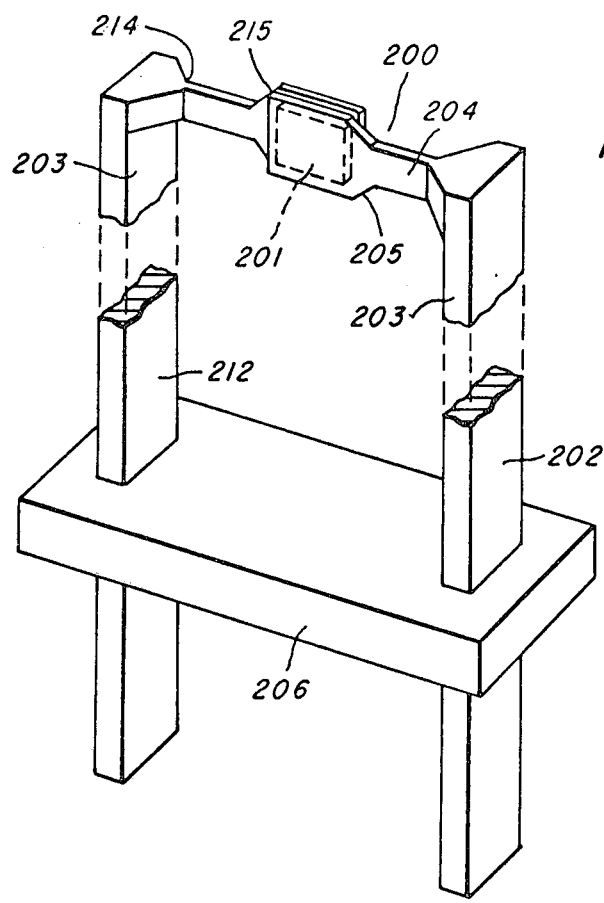
FIG. 3 is an illustration of the details of the construction of the flow sensor of the present invention.

Flow sensor 200 may be constructed as illustrated in FIG. 3. FIG. 3 illustrates that flow sensor 200 includes bulk silicon resistor 201, electrodes 202 and 212 and spacer 206. Bulk silicon resistor 201 is preferably a single chip of silicon having dimensions 0.50 mm by 0.50 mm by 0.15 mm with a donor impurity concentration of $10^{15}$ atoms per cubic centimeter. This impurity concentration will achieve the same temperature characteristics as the previously noted temperature sensors TSM102 and TSF102. This construction provides bulk resistor 201 with a resistance of approximately 27 ohms. Note that electrode 202 is illustrated as including a thick vertical portion 203, a thinner horizontal portion 204 and a paddle 205. Paddle 205 is in direct ohmic contact with one major face of bulk silicon resistor 201. Electrode 202 preferably has a width of about 0.30 mm and the thick portion 203 has a thickness of approximately 0.45 mm. Thin portion 204 and paddle 205 preferably have a thickness of approximately 0.10 mm. This construction technique enables thick portion 203 to provide the necessary mechanical strength for the device and for thin portion 204 and paddle 205 to provide a controlled thermal load on bulk silicon resistor 201. Electrode 212 is constructed in a similar fashion as electrode 202. Spacer 206 may be a single slab as illustrated in FIG. 3 or may be a modified TO-18 header as illustrated in FIG. 2.

Figure 4:
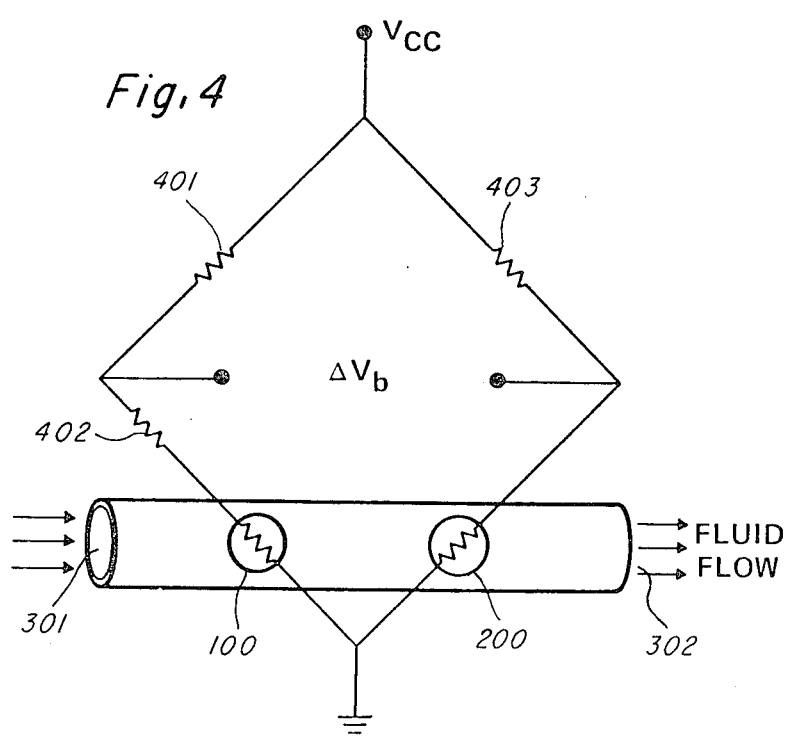
FIG. 4 is an illustration of a Wheatstone bridge embodiment of the present invention.

Temperature sensor 100 and flow sensor 200 together with an external resistor-bridge network are illustrated in FIG. 4. Temperature sensor 100 has a resistance $R_T$ at a predetermined reference temperature. Similarly, flow sensor 200 has a resistance of $R_F$ at the same predetermined temperature. Preferably, $R_F$ is much less than $R_T$. Resistor 401 is a fixed-value temperature independent resistor having the same resistance as the temperature sensor 100 at the reference temperature, that is having a resistance of $R_T$. Similarly, resistor 403 is a fixed-value temperature independent resistor having a resistance of $R_F$. Resistor 402 is called a temperature offset resistor. The resistance of this resistor 402 determines the amount of temperature differential between the flow sensor and the fluid. In concept, the circuit operates by keeping the bridge balanced (i.e., $\Delta V_b = 0$). With resistor 402 equal to 0 the circuit is a balanced Wheatstone bridge, since the relation $$R_{401}/R_T = R_{403}/R_F \tag{5}$$

is satisfied by the choice of $R_{401}$ and $R_{403}$ which are the resistances of resistors 401 and 403, respectively. Furthermore, $R_T$ and $R_F$ have the same temperature tracking characteristics and thus the bridge remains balanced for all temperatures. As the value of resistor 402 is increased from zero, the bridge becomes unbalanced unless the flow sensor 200 is at a higher temperature than temperature sensor 100. This difference in temperature causes an increase in the resistance of flow sensor 200 which automatically rebalances the bridge.

Note that both $R_{401}$ and $R_T$ can be much higher in resistance than $R_{403}$ and $R_F$ and still satisfy the bridge balance criteria of Equation (5). In the preferred embodiment the ratio between the predetermined temperature values of $R_F$ and $R_T$ is about 1:50 such that upon application of a voltage $V_{cc}$ to the bridge most of the current will go through the resistor 403 and flow sensor 200 causing a temperature rise in the flow sensor 200. These resistance values are selected so that the current flowing through temperature sensor 100 causes negligible self heating.

Keeping the bridge balanced assures that the temperature differential remains constant. The amount of power necessary to maintain the balanced condition depends only upon the fluid velocity according to Equation (4). The constants A and B in the equation are fixed by the choice of fluid and the geometry of the flow sensor. Returning now to Equation (2), it can be seen that the input power to the flow sensor 200 can be expressed as follows:

$$P_M = I_F^2 R_F = \frac{V_{cc}^2 R_F}{(R_{403} + R_F)^2} \tag{6}$$

where $I_F$ and $R_F$ are the current and resistance of flow sensor 200, respectively, and $V_{cc}$ is the bridge voltage. By equating the value of $P_{out}$ given in Equation (4) and the value of $P_{in}$ given in Equation (6) in accordance with Equation (2) a relation between the electrical parameters and the flow velocity can be obtained. Since voltage is a simpler and more direct quantity to measure than the power, the equation may be solved for the bridge voltage $V_{cc}$:

$$V_{cc} = (R_{403} + R_F)\sqrt{\frac{(A + Bv^{0.5})\Delta T}{R_F}} \tag{7}$$

By measuring bridge voltage, $V_{cc}$, necessary to balance the bridge, the fluid velocity can be uniquely determined if $\Delta T$ is a constant.

The response of each of the silicon temperature sensitive resistor sensors may be made linear over a given limited temperature interval such as between temperature $T_1$ and temperature $T_2$ by placing the appropriate value of resistance in parallel with the sensor. The temperature dependent resistance $R_p$ of the sensor-resistor parallel combination is then $$R_P = \frac{R_L R(T)}{R_L + R(T)} \tag{8}$$

where $R_L$ is the resistance of the linearization resistor and $R(T)$ is the temperature dependent resistance of the sensor. Linearization requires that $$dR_p/dT = \text{constant, and } d^2R_p/dT^2 = 0 \tag{9}$$

Using the approximation $$R(T) = CT^D \tag{10}$$

where C and D are both constant and T is the temperature in degrees Kelvin, in Equation (1) and using the conditions of Equation (9), the optimum value of parallel resistor $R_L$ $$R_L = (D+1)/(D-1)R(T) \tag{11}$$

For optimum results over the temperature interval bounded by $T_1$ and $T_2$, the value of T employed in solving Equation (11) should be taken as the midpoint of the interval.

In the Wheatstone bridge circuit illustrated in FIG. (5), the resistances of linearization resistors 501 and 502 are calculated so that the percent resistance change per degree Kelvin of each parallel combination of sensor and linearization resistor are equal and linear over the desired ambient temperature range. That is, $$\left(\frac{dR_{p1}}{dT}\right)/R_{p1}(T) = \left(\frac{dR_{p2}}{dT}\right)/R_{p2}(T) = \text{constant} \tag{12}$$

and $$\frac{d^2R_{p1}}{dT^2} = \frac{d^2R_{p2}}{dT^2} = 0 \tag{13}$$

where $R_{p1}$ is the resistance of the parallel combination of linearization resistor 501 and temperature sensor 100 and $R_{p2}$ is the resistance of the parallel combination of linearization resistor 502 and flow sensor 200. In practice it is sometimes not possible to achieve good slope matching and good linearity for both sensors at the same time. In such a case, it is preferred to select the resistance of linearization resistor 501 to achieve good linearity for the temperature sensor parallel combination over the temperature range desired and to pick the resistance of linearization resistor 502 to achieve slope matching for the parallel combination including flow sensor 200 at the center of the desired temperature range. The resistance of resistor 402 ($R_O$) in the bridge circuit can then be calculated so that when the bridge is balanced the difference in temperature between temperature sensor 100 and flow sensor 200 is constant. When the bridge is balanced the voltage at the junction between resistor 401 and resistor 402 equals the voltage at the junction between resistor 403 and the parallel combination of linearization resistor 502 and flow sensor 200. This can be expressed by $$(R_o+R_{p1})/R_o+R_{p1}+R_{401})=R_{p2}/(R_{p2}+R_{403}) \qquad (14)$$

where it is understood that both $R_{p1}$ and $R_{p2}$ are functions of temperature. By using the condition previously set that the resistance of resistor 401 equals the resistance of the parallel combination of linearization resistor 501 and temperature sensor 100 at the temperature $T_1$ and that the resistance of resistor 403 equals the resistance of the parallel combination of linearization resistor 502 and flow sensor 200 at the temperature $T_1$ $$R_{401}=R_{p1}(T_1) \text{ and } R_{403}=R_{p2}(T_1) \qquad (15)$$

together with the relation in Equation (12) the value of $R_O$ can be expressed in terms of K and $\Delta T$ as $$R_o=R_{p1}(T_1)K\Delta T \qquad (16)$$

Hence, the user may define $\Delta T$ and then calculate the appropriate value of $R_O$ needed to maintain $\Delta T$ constant when the bridge is in a balanced condition.

Figure 5:
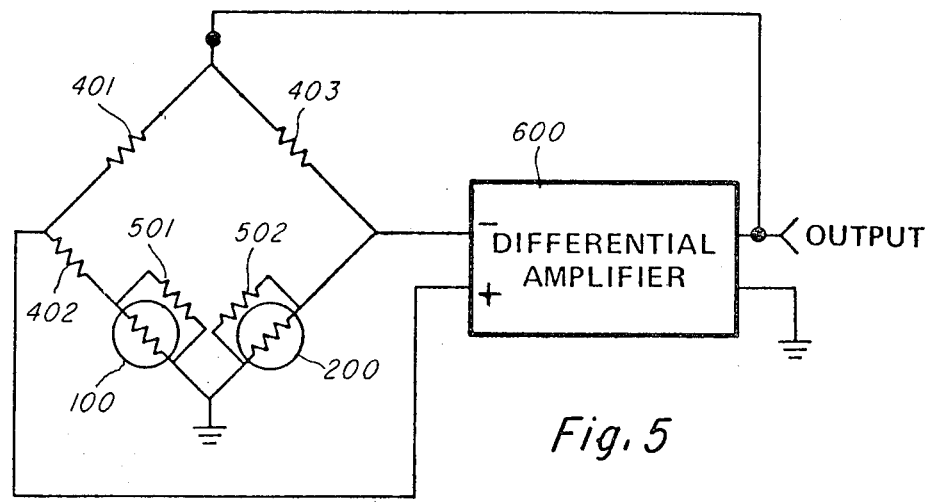
FIG. 5 is an illustration of a self-balancing Wheatstone bridge embodiment of the present invention including linearization resistors.

FIG. 5 illustrates an automatic bridge balancing circuit employing a differential amplifier. Note that the junction between resistor 403 and the parallel combination of linearization resistor 502 and flow sensor 200 is coupled to the inverting input of differential amplifier 600. In addition, the junction between resistors 401 and 402 is applied to the noninverting input of differential amplifier 600. As noted above, because of the non-zero resistance $R_O$ of resistor 402 the bridge is not in balance unless flow sensor 200 is at a higher temperature than temperature sensor 100. Suppose that the Wheatstone bridge circuit is initially in balance with flow sensor 200 operating at a temperature $\Delta T$ above the temperature of sensor 100. Thus, the voltage difference applied to the inputs of differential amplifier 600 would be very low, nearly zero, and the output voltage of differential amplifier 600 would be in proportion to the flow rate. Suppose the flow rate were to increase. This would cause greater convective cooling of flow sensor 200 and therefore the temperature of this flow sensor would tend to decrease. This decrease would result in a smaller voltage being applied to the inverting input of differential amplifier 600. Therefore, the bridge would tend to become unbalanced. Differential amplifier 600 would greatly amplify this small imbalance in voltages and apply this amplified voltage across the Wheatstone bridge. This greater voltage applied across the Wheatstone bridge would tend to increase the current flowing through each branch of the Wheatstone bridge. In accordance with the limitation previously noted, the resistance of the series combination of resistors 401 and 402 with the parallel combination of linearization resistor 501 and temperature sensor 100 would be at least 50 times the resistance of the series combination of resistor 403 with the parallel combination of linearization resistor 501 and flow sensor 200. This differential in series resistance means that most of the additional electrical power would be applied to the series circuit including flow sensor 200. This increased current through flow sensor 200 would tend to increase its temperature due to self heating and thereby increase its resistance. This increase in resistance would tend to bring the bridge back into balance. Note that it is most important that the resistance ratios between these two parallel circuits be such that temperature sensor 100 undergoes negligible self-heating due to the voltage applied across the bridge circuit. Thus, an increase in flow rate would tend the system toward a new balance at an increased output voltage. Similarly, if the flow rate were to decrease, the temperature of flow sensor 200 would increase causing an increased voltage to be applied to the inverting input of differential amplifier 600. This would tend to unbalance the bridge in the opposite direction and cause differential amplifier 600 to produce a smaller output voltage. This smaller output voltage would decrease the electrical self-heating of flow sensor 200, thereby decreasing its temperature and tending to shift the system to a new balance at a lower output voltage. As explained above, it can be clearly seen that the output voltage of differential amplifier 600 is proportional to the rate of flow past flow sensor 200.

Figure 6:
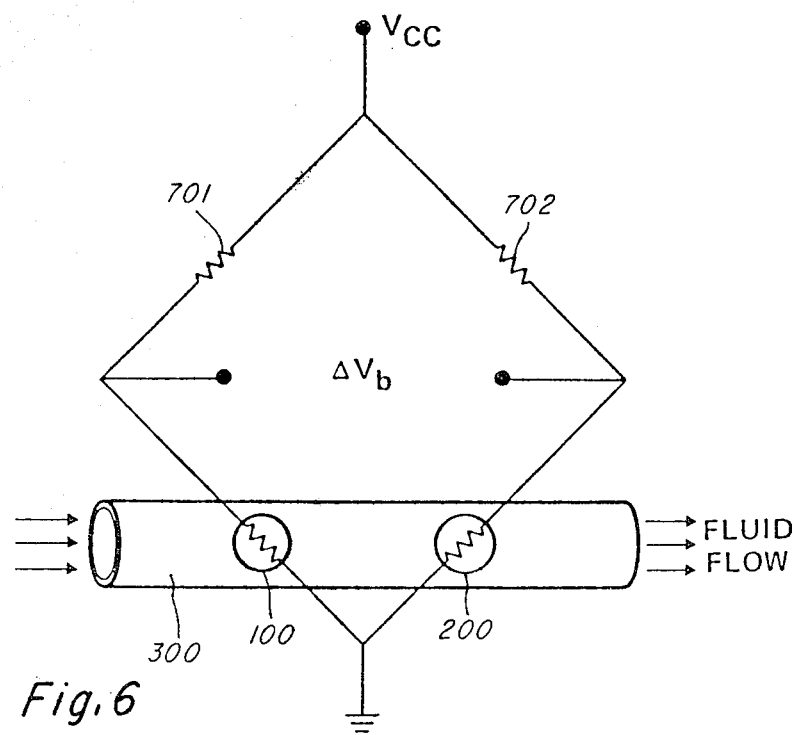
FIG. 6 is an illustration of a further Wheatstone bridge embodiment of the present invention.

Another Wheatstone bridge circuit which can be used to embody the present invention is illustrated in FIG. 6. Resistor 701 is selected as having the same resistance as temperature sensor 100 has at a reference temperature. This value of resistance is identical to the value of resistor 401 illustrated in FIG. 4. Resistor 702 is selected as having the same resistance as flow sensor 200 has at a temperature a predetermined amount greater than the reference temperature. Thus the bridge circuit illustrated in FIG. 6 is in balance under the same conditions as the bridge circuit illustrated in FIG. 4, that is only if the temperature of flow sensor 200 exceeds the temperature of temperature sensor 100 by the predetermined amount. The circuit illustrated in FIG. 6 may be included in a self-balancing circuit in a manner analogous to the circuit shown in FIG. 5, that is by connecting the noninverting input of a differential amplifier to the junction between resistor 701 and temperature sensor 100, connecting the inverting input to the junction between resistor 702 and flow sensor 200 and connecting the output of the differential amplifier to supply the voltage $V_{cc}$. As in the case of the circuit shown in FIG. 5, the resistances of resistor 701 and temperature sensor 100 must be large enough to prevent self heating of temperature sensor 100. In addition, linearization resistors such as linearization resistors 501 and 502 may also be employed in the embodiment shown in FIG. 6. This embodiment eliminates the need for the resistor 402 shown in FIG. 4 by adjustment of the resistance of resistor 403. This results in the advantageous elimination of a previously required component. The temperature tracking of the circuit illustrated in FIG. 6 is not as good as the temperature tracking of the circuit shown in FIG. 4, that is the temperature difference between the sensors necessary to balance the bridge tends to diverge somewhat from the initial difference as the fluid temperature changes from the reference temperature. The temperature tracking is best for a small initial difference in temperature between the sensors.

We claim:

1. An automated fluid flow measurement system comprising:

a first silicon resistor disposed in a position having a fluid flow therepast having an impurity concentration for causing a positive temperature coefficient of resistance and having a first predetermined resistance at a reference temperature;

a second silicon resistor disposed in a position exposed to the same temperature as the temperature of the fluid flowing past said first silicon resistance element having an impurity concentration equal to the impurity concentration of said first silicon resistor and having a second predetermined resistance at said reference temperature, said second predetermined resistance being greater than said first predetermined resistance;

a temperature measurement means connected to said second silicon resistor for measuring the electrical resistance of said second silicon resistor thereby providing a measure of the temperature of the fluid; and a flow measurement means connected to said first silicon resistor and said temperature measurement means for measuring the electrical resistance of said first silicon resistor thereby providing a measure of the temperature of said first silicon resistors for applying electrical power to said first silicon resistor to heat said first silicon resistor to a temperature a predetermined amount higher than the temperature of the fluid and for generating a signal indicative of the amount of electric power applied to said first silicon resistor, said signal indicating the rate of flow of the fluid past said first silicon resistor.

2. An automated fluid flow measurement system as claimed in claim 1, wherein:

said temperature measurement means comprises the series combination of a first fixed resistor having a resistance equal to said second predetermined resistance and a second fixed resistor connected in series to said second silicon resistor, said measure of the temperature of the fluid being the voltage at the junction between said first and second fixed resistors when a voltage is applied across the series combination of said first and second fixed resistors and said second silicon resistor; and said flow measurement means comprises a third fixed resistor having a resistance equal to said first predetermined resistance connected in series to said first silicon resistor, said measure of the temperature of said first temperature sensitive resistance being the voltage at the junction between said third fixed resistor and said first silicon resistor when a voltage is applied across the series combination of said third fixed resistor and said first silicon resistor, and a differential amplifier circuit having a noninverting input terminal connected to said junction between said first and second fixed resistors, an inverting input terminal connected to said junction between said third fixed resistor and said first silicon resistor, and an output terminal generating an output voltage proportional to the difference between the voltage applied to said noninverting terminal and the voltage applied to said inverting terminal, said output voltage being applied across both the series combination of said first and second fixed resistors and said second silicon resistor and the series combination of said third fixed resistor and said first silicon resistor, said output voltage being said signal indicating the rate of flow of the fluid.

3. An automated fluid flow measurement means as claimed in claim 2, wherein:

said first temperature sensitive resistance comprises a first parallel combination of a first temperature sensitive resistor disposed in a position having the fluid flow therepast and a first linearization resistor having a temperature insensitive resistance for causing the resistance of said first parallel combination to vary substantially linearly with respect to a change in temperature within a range of temperatures near said reference temperature; and said second temperature sensitive resistance comprises a second parallel combination of a second temperature sensitive resistor disposed in a position exposed to the same temperature as the temperature of the fluid and a second linearization resistor having a temperature insensitive resistance for causing the resistance of said second parallel combination to vary substantially linearly with respect to a change in temperature within a range of temperatures near said reference temperature with the same slope as said first parallel combination.

4. An automated fluid flow measurement system as claimed in claim 1, wherein:

said temperature measurement means comprises a first fixed resistor having a resistance equal to said second predetermined resistance connected in series to said second silicon resistor, said measurement of the temperature of the fluid being the voltage at the junction between said first fixed resistor and said second silicon resistor when a voltage is applied across the series combination of said first fixed resistor and said second silicon resistor; and said flow measurement means comprises a second fixed resistor having a resistance equal to the resistance of said first silicon resistor at a temperature said predetermined amount higher than said reference temperature connected in series to said first silicon resistor, said measure of the temperature of said first silicon resistor being the voltage at the junction of said second fixed resistor and said first silicon resistor when a voltage is applied across the series combination of said second fixed resistor and said first silicon resistor, and a differential amplifier circuit having a noninverting input terminal connected to said junction between said first fixed resistor and said second silicon resistor, an inverting input terminal connected to said junction between said second fixed resistor and said first silicon resistor, and an output terminal generating an output voltage proportional to the difference the voltage applied so said noninverting terminal and the voltage applied to said inverting terminal, said output voltage being applied across both the series combination of said first fixed resistor and said second silicon resistor and the series combination of said second fixed resistor and said first silicon resistor, said output voltage being said signal indicating the rate of flow of the fluid.

5. An automated fluid flow measurement means as claimed in claim 4, wherein:

said first temperature sensitive resistance comprises a first parallel combination of a first temperature sensitive resistor disposed in a position having the fluid flow therepast and a first linearization resistor having a temperature insensitive resistance for causing the resistance of said first parallel combination to vary substantially linearly with respect to a change in temperature within a range of temperatures near said reference temperature; and said second temperature sensitive resistance comprises a second parallel combination of a second temperature sensitive resistor disposed in a position exposed to the same temperature as the temperature of the fluid and a second linearization resistor having a temperature insensitive resistance for causing the resistance of said second parallel combination to vary substantially linearly with respect to a change in temperature within a range of temperatures near said reference temperature with the same slope as said first parallel combination.

* * * * *